Nov. 11, 1930.  C. L. BYRON  1,781,493
LUBRICATING MEANS
Filed March 25, 1926
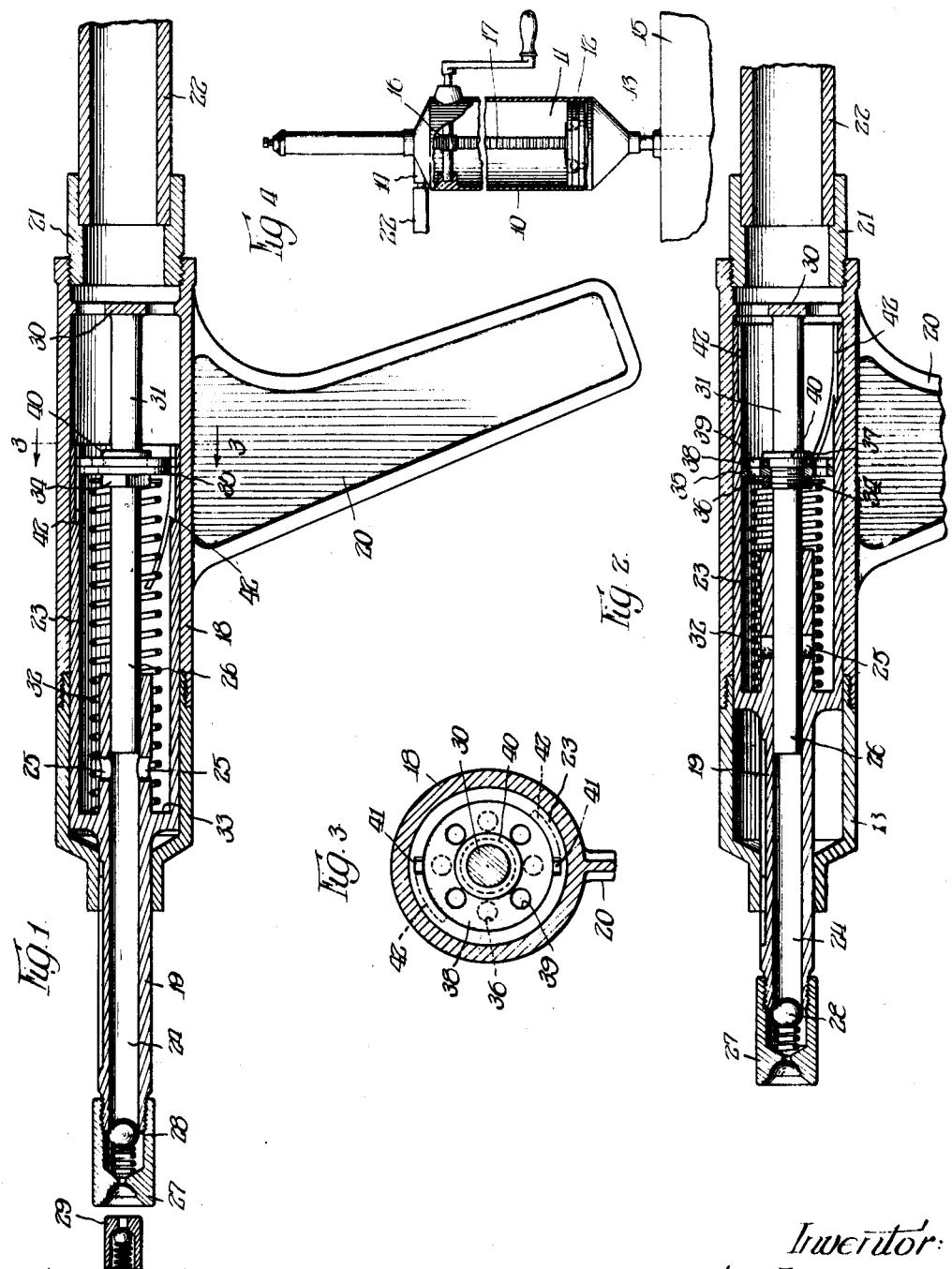

Patented Nov. 11, 1930

1,781,493

UNITED STATES PATENT OFFICE

CHARLES L. BYRON, OF CHICAGO, ILLINOIS, ASSIGNOR, BY MESNE ASSIGNMENTS, TO THE WAYNE PUMP COMPANY, OF BALTIMORE, MARYLAND, A CORPORATION OF MARYLAND

LUBRICATING MEANS

Application filed March 25, 1926. Serial No. 97,167.

This invention relates to lubricating means, and more particularly to means for supplying lubricant under a relatively high pressure to bearings and various other parts of an automobile or the like.

One object of the invention is to provide a simple, reliable, efficient and preferably portable lubricating device by means of which a lubricant may be forced into bearings offering high resistance to passage of the lubricant.

Another object is to provide a lubricating device comprising a low pressure lubricant supplying means and a communicating high pressure lubricant supplying means in which leakage of grease from the high pressure means is prevented when the device is not in use.

Another object is to provide a high pressure grease gun which is simple and efficient and adapted to meet the various requirements under service conditions.

These and other objects are accomplished by means of the arrangement disclosed on the accompanying sheet of drawings, in which—

Figure 1 is a fragmentary longitudinal sectional view of a high pressure grease gun forming a part of the invention and indicating an associated nipple to receive a charge of grease, and also showing a portion of the flexible grease conducting member which connects the high pressure gun to the relatively low pressure grease supply means or pump, the high pressure grease gun being shown with its parts arranged when not in use, or in other words, with its plunger retracted;

Figure 2 is a similar sectional view of the high pressure grease gun with the plunger advanced for discharging grease under a relatively high pressure;

Figure 3 is a sectional view taken in the plane of line 3—3 of Figure 1; and

Figure 4 is a fragmentary sectional view on a relatively small scale of a grease pump or compressor which is connected to the high pressure gun.

The various novel features of the invention will be apparent from the following description and drawings, and will be particularly pointed out in the appended claims.

The low pressure grease pump or compressor 10 includes a cylinder 11 in which a piston 12 is reciprocated for drawing grease into the cylinder 11 through a member 13 and discharging grease from the cylinder through a discharge connection 14. The member 13 may extend into and be secured to a grease containing barrel 15. Any suitable mechanism may be provided for operating the piston such as a pinion 16 which meshes with and drives a rack 17 secured to the piston.

The high pressure grease gun includes two slidably mounted telescopically arranged cylindrical members 18 and 19, the former of which is provided with a handle 20 by means of which the gun may be operated by one hand. The rear of the hollow cylindrical member 18 is provided with a nipple 21 to which one end of a flexible lubricant conducting member or hose 22 is connected. The other end of the hose 22 is connected to the discharge opening 14 of the compressor or pump 10. The other member 19 of the high pressure grease gun includes a grease receiving barrel 23 and a grease discharge barrel 24, the latter having a rearwardly extending portion with apertures 25 by means of which said barrels 23 and 24 communicate at times for the passage of grease from the receiving barrel to the discharge barrel. A plunger 26 is adapted to be reciprocated in sa. l discharge barrel 24 in a manner such that when the plunger 26 is moved forwardly from its rear position, as shown in Figure 1, into the position shown in Figure 2, the plunger compresses grease within the discharge barrel and discharges the grease outwardly through the nozzle 27, the latter including a spring pressed ball valve 28 for normally closing the discharge opening in the discharge barrel 24. The plunger 26 is thrust forwardly when the handle 20 is thrust forwardly and the nozzle 27 is in engagement with an associated nipple 29 through which grease is forced to a bearing. The handle 20 preferably is formed integrally with the member 18 as is also the apertured spider 30 which has a stem 31 engaging the rear of the plunger 26. The plunger is returned to its rearward position by a spring 32 interposed between the front wall 33 of the grease receiving barrel 23 and an abutment in the form of nut 34 secured to the plunger 26. A stationary disk valve member 35 having a plurality of circumferentially arranged apertures 36 is secured to the plunger 26 between a collar 37 and the nut 34. Cooperating with the stationary apertured disk valve member 35 is a rotatably mounted disk valve member 38 having a series of circumferentially spaced apertures 39, said rotatable valve member 38 being rotatably mounted upon the collar 37 of the plunger 26 and being held against displacement on said plunger by a collar 40. This rotatable valve member 38 is provided with two projections 41 which are adapted to travel in the cam-shaped guideways 42 formed in the receiving barrel member 23 whereby as the plunger 26 is moved forwardly, through forward movement of the handle 20, barrel 18 and stem 31, the rotatably mounted valve member 38 is rotated in a manner to bring the apertures 36 and 39 of the valve members 35 and 38 into register, as shown in Figure 2, and likewise, when the plunger 26 is returned by the action of the spring 23, the apertures are moved out of register, as shown in Figures 1 and 3.

As shown in Figure 2, the plunger 26 has cut off communication between the grease discharging barrel 24 and the grease receiving barrel 23 and has compressed grease in the forward end of the discharge barrel 24 for discharging it past the ball valve 28 and under relatively high pressure into the associated nipple 29 for lubricating a bearing. With the parts as shown in Figure 2, it will be appreciated that the grease under pressure from the pump 10 is forced through the hose 22 into the grease gun and through the registering apertures 36 and 39 into the front part of the grease receiving barrel 23. When the plunger moves back into the position shown in Figure 1, grease in the grease receiving barrel 23 is drawn into the grease discharge barrel 24 as a result of the partial vacuum created therein by the withdrawal movement of the plunger 26. At the same time, the apertures 36 and 39 in the relatively rotatable disks 35 and 38 are moved out of register so that pressure from the pump 10 is not transmitted to the grease in the grease discharging barrel 24, and accordingly, grease is prevented from dripping from the high pressure gun when the latter is not in use. It will be understood that the spring 32 is sufficiently strong to hold the plunger 26 and disks 35 and 38 against the pressure with which grease is fed to the gun.

It is my intention to cover all modifications of the invention falling within the spirit and scope of the following claims.

I claim:

1. A high pressure lubricant gun comprising a lubricant receiving barrel and a lubricant discharge barrel adapted to communicate with each other, a plunger operable to shut off such communication and subject lubricant in the discharge barrel to an increased pressure and also operable to permit communication between said lubricant receiving and discharge barrels, and two relatively movable apertured disks mounted within said lubricant receiving barrel, one of which disks is automatically moved to bring the apertures into register for permitting the flow of lubricant in said receiving barrel under certain circumstances and which is moved into another position under other circumstances to move said apertures out of register to prevent the flow of lubricant into said barrel.

2. A high pressure lubricant gun comprising a lubricant receiving barrel and a lubricant discharge barrel adapted to communicate with each other, a plunger operable in said discharge barrel for cutting off communication between said barrels and discharging lubricant at a relatively high pressure, and a rotatably mounted valve member movable with the plunger for permitting flow of lubricant into said receiving barrel under certain conditions and which prevents flow of lubricant into said receiving barrel under other circumstances to prevent leakage from said gun when the latter is not in use.

3. A high pressure lubricant gun comprising a lubricant receiving barrel and a lubricant discharge barrel adapted to communicate with each other, a plunger operable in said discharge barrel for cutting off communication between said barrels and discharging lubricant at a relatively high pressure, a rotatably mounted valve member movable with the plunger for permitting flow of lubricant into said receiving barrel under certain conditions and which prevents flow of lubricant into said receiving barrel under other circumstances to prevent leakage from said gun when the latter is not in use, and means for controlling the movement of said valve.

4. In a high pressure lubricant gun comprising two telescopically arranged relatively movable members, one of said members including a lubricant receiving barrel and a lubricant discharge barrel having a communicating passageway therebetween, a plunger operable in said discharge barrel for cutting off communication between said barrels and discharging lubricant from the discharge barrel at a relatively high pressure, a stationary apertured disk and a movable apertured disk mounted on said plunger and movable therewith, and means for moving said movable disk, as the plunger is moved, for moving the apertures into register for permitting the flow of lubricant into said receiving barrel and for moving said movable disk for moving said apertures out of register for preventing flow of lubricant into said receiving barrel when the plunger is returned to retracted position.

5. In a dispensing nozzle for lubricant dispensing apparatus, the combination of relatively movable telescopically arranged communicating members and fixed and rotatably movable means in said members and controlled thereby for controlling communication into said members, and means for controlling communication from said members.

6. In a lubricant dispensing nozzle the combination with adjacent cooperating relatively movable operating members, one of said members being provided with fixed and rotatively movable means, said movable means being controlled by the other of said members for controlling the flow of grease into said other member.

7. In a device for discharging grease the combination with relatively movable operating members, fixed and rotatively movable means on one of said members controlled by the other of said members for controlling the flow of grease into said other member and apertures in each of said fixed and movable means adapted to register when said first named operating members are in position for discharging grease from said device.

8. In a lubricant dispensing nozzle, the combination of a casing member adapted to be supplied with lubricant, a discharge member movably mounted in said casing member, said discharge member having a lubricant discharge portion, a relatively fixed member mounted on said casing member and having a portion extending into said discharge portion whereby movement of said discharge member causes discharge of lubricant from said discharge portion by said fixed member, and revoluble means associated with one of said members for controlling supply of lubricant to one of said members.

9. In a lubricant dispensing nozzle, the combination of a casing member adapted to be supplied with lubricant, a discharge member movably mounted in said casing member, said discharge member having a lubricant discharge portion, a relatively fixed member mounted on said casing member and having a portion extending into said discharge portion whereby movement of said discharge member causes discharge of lubricant from said discharge portion by said fixed member, and revoluble means in said casing for controlling flow of lubricant into said discharge member.

10. In a lubricant dispensing nozzle, the combination of a casing member adapted to be supplied with lubricant, a discharge member movably mounted in said casing member, said discharge member having a lubricant discharge portion, a relatively fixed member mounted on said casing member and having a portion extending into said discharge portion whereby movement of said discharge member causes discharge of lubricant from said discharge portion by said fixed member, and revoluble means in said casing operated by said discharge member for controlling flow of lubricant into said discharge member.

11. In a lubricant dispensing nozzle, the combination of a casing member adapted to be supplied with lubricant, a discharge member movably mounted in said casing member, said discharge member having a lubricant discharge portion, a relatively fixed member mounted on said casing member and having a portion extending into said discharge portion whereby movement of said discharge member causes discharge of lubricant from said discharge portion by said fixed member, and means in said casing mounted on said fixed member and operated by said discharge member for controlling flow of lubricant into said discharge member.

12. In a lubricant dispensing nozzle, the combination of a casing member adapted to be supplied with lubricant, a discharge member movably mounted in said casing member, said discharge member having a lubricant discharge portion extending partially within said discharge member, said discharge portion having an opening therein for receiving lubricant from said discharge member, a relatively fixed member mounted on said casing member and having a portion extending into said discharge portion whereby in inoperative position said opening is open, revoluble means on said fixed member disposed to prevent ingress of lubricant to said discharge member when said opening is open, relative movement between said discharge member and said fixed member causing said fixed member to close said opening and expel lubricant from said discharge portion, said revoluble means being adapted to open to permit ingress of lubricant to said discharge member when said opening is closed.

13. In a lubricant dispensing nozzle, the combination of a casing member adapted to be supplied with lubricant, a discharge member movably mounted in said casing member, said discharge member having a lubricant discharge portion extending partially within said discharge member, said discharge portion having an opening therein for receiving lubricant from said discharge member, a relatively fixed member mounted on said casing member and having a portion extending into said discharge portion whereby in inoperative position said opening is open, revoluble means on said fixed member co-operating with said discharge member, operable by said discharge member to open position to permit ingress of lubricant to said discharge member when said opening is closed.

Signed at Chicago, Illinois, this 22nd day of March, 1926.

CHARLES L. BYRON.